Nov. 15, 1960  J. F. ANETSBERGER  2,960,044
ADJUSTABLE DOUGH SIZING GUIDE MECHANISM FOR SHEETERS
Filed April 16, 1957  2 Sheets-Sheet 1
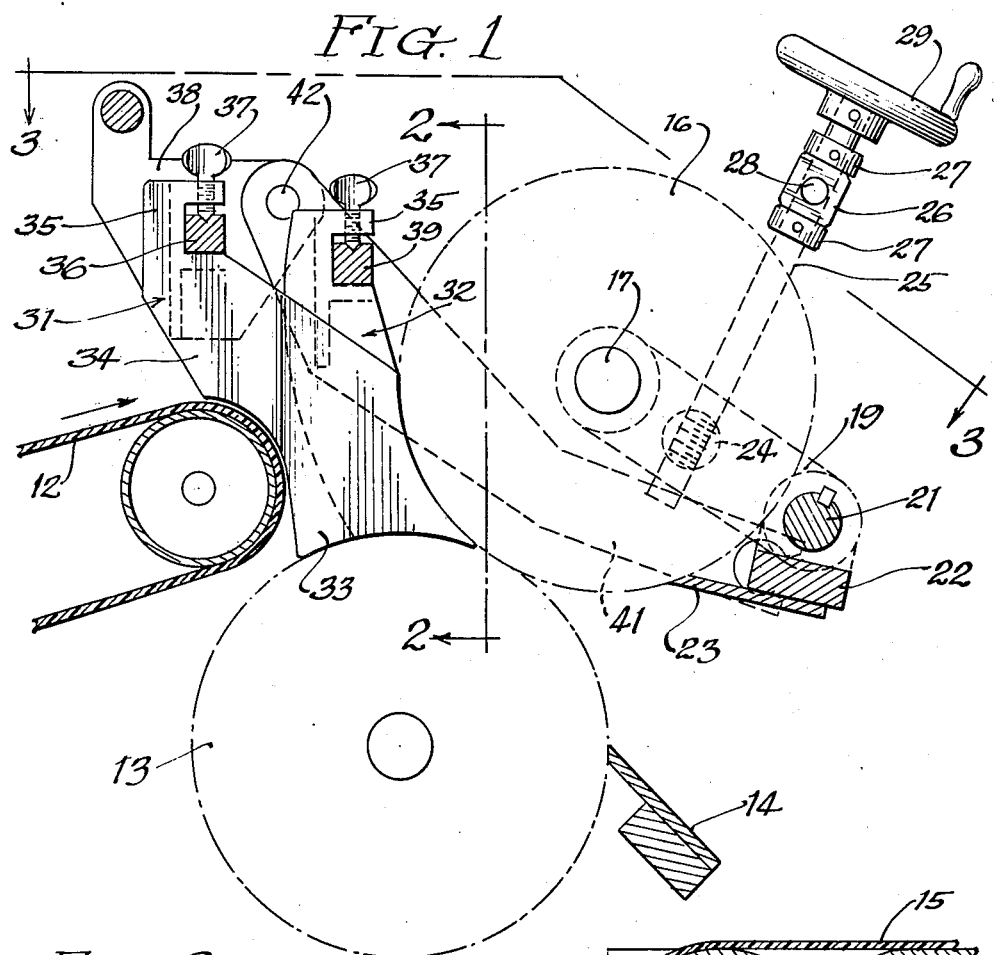
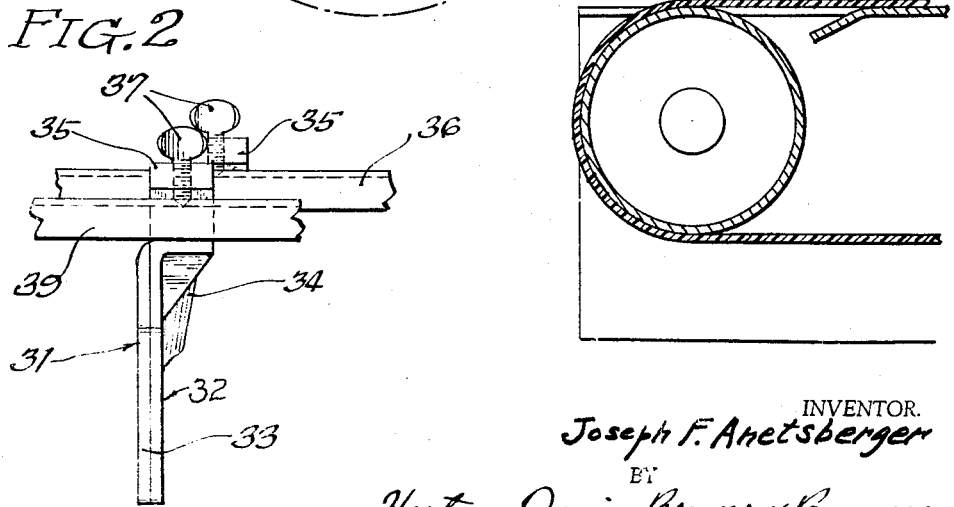
INVENTOR.
Joseph F. Anetsberger
BY
Horton, Davis, Brewer + Krugman
Attorneys Nov. 15, 1960    J. F. ANETSBERGER    2,960,044
ADJUSTABLE DOUGH SIZING GUIDE MECHANISM FOR SHEETERS
Filed April 16, 1957    2 Sheets-Sheet 2
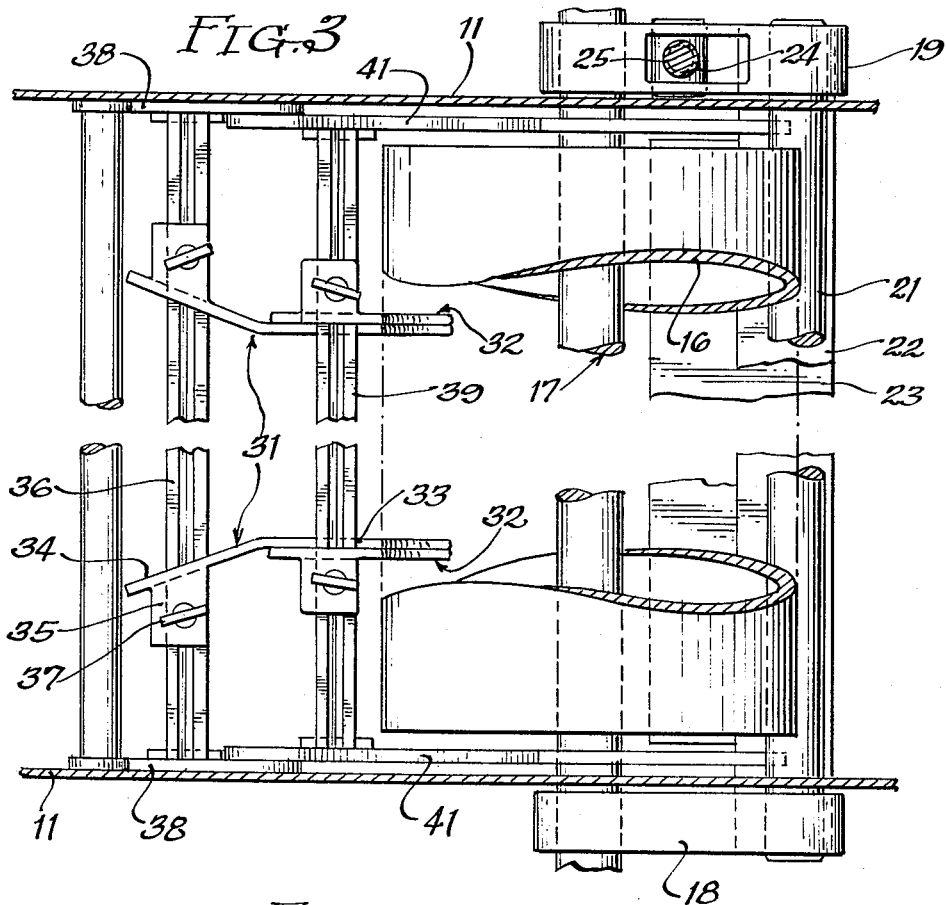
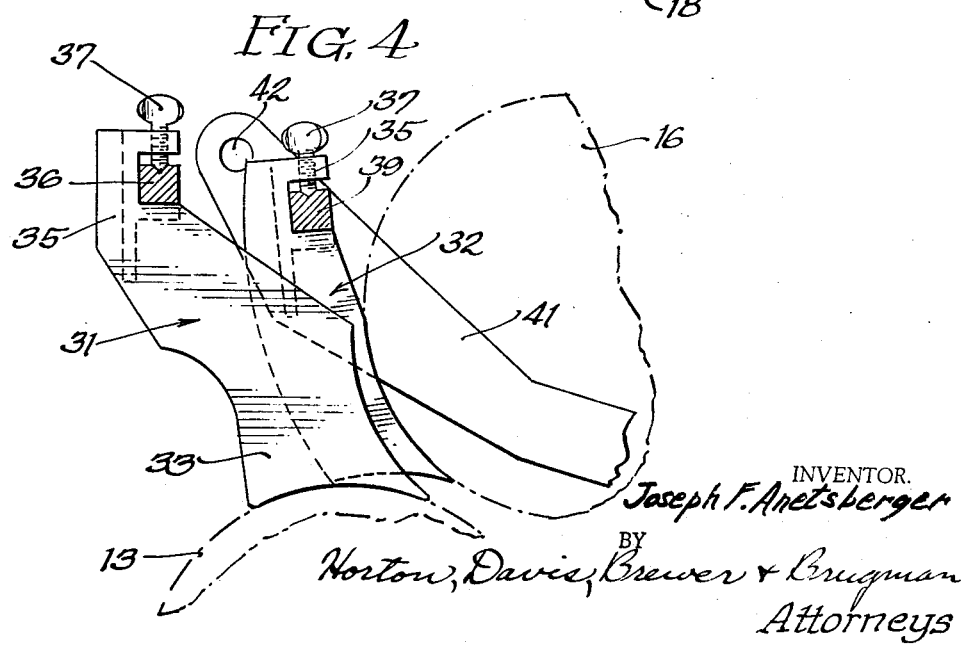
INVENTOR.
Joseph F. Anetsberger
BY
Horton, Davis, Brewer & Brugman
Attorneys

United States Patent Office 2,960,044
Patented Nov. 15, 1960

2,960,044

ADJUSTABLE DOUGH SIZING GUIDE MECHANISM FOR SHEETERS

Joseph F. Anetsberger, Northbrook, Ill., assignor to Anetsberger Brothers, Inc., Northbrook, Ill., a corporation of Illinois Filed Apr. 16, 1957, Ser. No. 653,210

12 Claims. (Cl. 107—12)

This invention relates in general to automatic dough handling equipment and more particularly to improvements in adjustable dough sizing guide mechanism for sheeters.

The guide mechanisms of the prior art, which are provided for aligning the dough being fed to a sheeter, permit excess dough to be squeezed between them and the sheeter rolls laterally, or axially of the rolls, when the latter are adjusted relative to each other to change the thickness of the delivered sheet. Consequently, they cannot prevent uncontrollable variations in the width of the dough sheet delivered by the sheeter. As a result, the weight and size of dough pieces subsequently cut from the sheet will vary and, even if the specific type of cutter employed reduces the likelihood of such variations, unwanted and wasteful excess trimmings will be left.

A principal object of this invention is to assure uniformity of size of a sheet of dough produced by a dough sheeter and thereby to prevent waste and insure identical end products.

More specifically, an important object of this invention is to prevent any dough from being squeezed outwardly laterally or axially of the rolls of a sheeter beyond the desired width of dough sheet being produced when the rolls are adjusted peripherally relative to each other to vary the thickness of the dough sheet. This is accomplished in the illustrated embodiment by providing novel dough sizing guide mechanism which is automatically maintained in engagement with both sheeter rolls at all times and regardless of the particular sheet thickness-producing spacing between the rolls.

Numerous other objects and advantages of the invention will be apparent as it is better understood from the following description, which, when taken in connection with the accompanying drawings, discloses a preferred embodiment thereof.

In the drawings:

Figure 1 is a vertical section, with parts broken away, of a dough sheeter incorporating adjustable dough sizer guide mechanism embodying the present invention, and showing the dough sizer rolls substantially in peripheral contact with each other;

Fig. 2 is a detail front elevation of the righthand pair of associated guide members forming a part of such guide mechanism, as seen from the line 2—2 of Fig. 1;

Fig. 3 is a top plan view, with parts in section, as seen from line 3—3 of Fig. 1; and Fig. 4 is an elevational view similar to Fig. 1 showing the dough sizer rolls peripherally spaced from each other.

Referring more particularly to the drawings, a dough sheeter embodying the features of this invention is illustrated therein as comprising a pair of side frame members 11 (Fig. 3). Means are provided for delivering dough to the inlet side or rear of the sheeter, shown in Fig. 1 as comprising an endless belt conveyor 12. This conveyor 12 is positioned between the side frame members 11 to deliver dough onto a first main sheeter or finishing dough roller 13 extending laterally between, and journalled in any suitable manner in, the side frame members 11. Suitable means are provided for rotating the roller 13 in a clockwise direction, as viewed in Fig. 1, and a scraper 14 is mounted in any desired manner at the outlet side or front of the machine between the side frame members 11 for peripherally contacting the roller 13 and directing the rolled dough onto a suitable work surface, shown as comprising a second endless conveyor 15.

A second main sheeter or finishing dough roller 16 is disposed above and adjacent the first main roller 13 for cooperation therewith in effecting the desired sheeting action of the dough. As best seen in Fig. 3, this second main roller 16 is carried by a shaft 17 which extends through suitable slots in the side frame members 11 and is journalled in an end of a pair of arms 18 and 19. The other end of each of these roller arms 18 and 19 is keyed to a transverse supporting shaft 21 extending through and suitably journalled in the side frame members 11. Secured in any desired manner to the end portions of the roller arms 18 and 19 and depending therefrom is a transversely extending bar 22 which carries a scraper 23 having peripheral contact with the second main roller 16, as best seen in Fig. 1. It will be understood that the scrapers 14 and 23 preferably are suitably mounted for selective adjustment relative to their respective sheeter rolls, but means for accomplishing such adjustment are not disclosed herein as they form no part of the instant invention. The roller 16 is rotated in a counterclockwise direction, viewing Fig. 1, by any suitable means in synchronism with roller 13.

Means are provided for selectively adjusting or positioning the second main roller 16 in peripherally stepped relation to the first main roller 13 to vary the dough sheet thickness-producing spacing between said rollers. This adjustable mounting means, in addition to the shafts 17 and 21 and the arms 18 and 19, comprises the following mechanism. The roller arm 19 is suitably recessed intermediate its ends to rotatably receive a transversely extending cylindrical stud 24 (Fig. 3) and to provide clearance for a threaded shaft 25 which is disposed within and cooperates with a suitable tapped aperture extending through the stud 24 normal to the axis thereof. Only the lower portion of the shaft 25 cooperating with the stud 24 is threaded, the upper end thereof having a sleeve 26 rotatably mounted thereon and collars 27 secured thereto above and below the sleeve 26 to prevent relative movement between the sleeve 26 and shaft 25 axially of the latter. The sleeve 26 is provided with a suitable transversely extending stud 28 (Fig. 1) which is journalled in the adjacent side frame member 11, and crank means is mounted on the upper end of the shaft 25 for manually rotating the same, which is shown in Fig. 1 as comprising a suitable hand wheel 29.

With the above-described adjustable mounting means for the roller 16, it will be appreciated that rotation of the hand wheel 29 will either raise or lower the cylindrical stud 24 relative to the side frame members 11 which will swing the roller arm 19 upwardly or downwardly about a pivot point comprising the axis of the transverse supporting shaft 21. Since the latter is keyed to both of the roller arms 18 and 19, such movement will result in swinging of the shaft 17 and its roller 16 about the axis of the shaft 21 toward or away from the other main roller 13 to selectively vary the dough sheet thickness-producing spacing between the rollers 13 and 16. In Fig. 1, the rollers are shown in peripheral contact with each other, while Fig. 4 illustrates them as disposed in peripherally spaced relationship. By virtue of the previously described mounting of the scraper 23, any such positional adjustment of the roller 16 assures the scraper 23 being maintained in peripheral engagement with the roller 16.

This invention contemplates the provision of dough sizing guide mechanism which is automatically maintained in peripheral engagement with both sheeter rollers 13 and 16 at all times and regardless of the particular sheet thickness-producing spacing between the rolls, in order to prevent any dough from being squeezed outwardly laterally or axially of the rolls beyond the desired width of dough sheet being produced. This guide mechanism comprises a first pair of guide members 31 and a second pair of guide members 32 cooperating, respectively, therewith. Each guide member 31 comprises an inner portion 33 disposed at right angles to the axis of the rollers 13 and 16, and an outer portion 34 formed integrally therewith and flaring outwardly therefrom laterally of the machine. The lower end of the inner portion 33 is suitably curved (Figs. 1 and 4) to peripherally engage the main roller 13, while the inner edge thereof is similarly curved to peripherally engage the upper roller 16 when it is in its lowermost position of Fig. 1. The lower part of the outer flared portion 34 is shaped to closely conform to the innermost path of movement of the dough delivering endless belt 12 (Fig. 1).

The upper end of the outer flared portion 34 of each outer guide member 31 is provided with a laterally extending mounting bracket 35, preferably formed integrally therewith, which is recessed along its inner edge to accommodate and engage a transversely extending bar 36. A thumb screw 37 is disposed in a suitable tapped aperture extending through the upper portion of each bracket 35 for engagement with the transverse bar 36 to secure the guide member in any selected adjusted position thereon. The outer ends of the bar 36 are rigidly secured in any desired manner either to the side frame members 11 or auxiliary frame members 38 (Fig. 3) rigidly mounted upon the main frame members 11. With this arrangement, loosening of the thumb screw 37 will permit selective positioning of its guide member 31 on the transverse bar 36, and tightening of the thumb screw will maintain the guide member in such adjusted position and insure proper peripheral engagement of the lower end of its inner portion 33 with the lower main roller 13, the lower portion of the transverse recess in the inner edge of the associated bracket portion 35 being shaped to conform to the configuration of the transverse bar 36 which is non-cylindrical.

The instant guide mechanism also comprises the second guide members 32 and the similarly constructed means for mounting the same, together with means for insuring proper peripheral contact thereof with the upper main roller 16 at all times. Each of these guide members 32 terminates in a curved inner edge at its lower end conforming to, and peripherally engaging, the outer surface of the roller 16, as best seen in Fig. 4. At its upper end, each of the guide members 32 is provided with a bracket portion 35 similar to that of the associated guide member 31 and a thumb screw 37 for mounting the guide members 32 on a transverse bar 39 which is non-cylindrical in shape similarly to the bar 36. The outer ends of this transverse bar 39 are secured in any suitable manner to levers 41. The upper end of each lever 41 is pivotally mounted, as by means of a suitable stud 42 (Fig. 1) carried by, and extending inwardly from, the associated auxiliary frame member 38. Each of these levers 41 terminates at its other end in a forked portion which receives and engages the transverse bar 22 that mounts the scraper 23.

With the above-described arrangement, it will be understood that adjustable movements of the upper main roller 16 will result in maintaining of the curved edges of the inner guide members 32 constantly in peripheral engagement with roller 16 through the agency of the bar 22, levers 41, and bar 39. Consequently, the space which would otherwise obtain between the upper roller 16 and the laterally adjustable guide members upon upward movement of the roller 16 relative to the lower main roller 13 will be closed by the guide members 32. Thus dough being rolled between the sheeter rolls 13 and 16, as delivered thereto by the endless belt conveyor 12, will be prevented from being squeezed outwardly laterally or axially of the rolls beyond the desired width of the dough sheet being produced, as determined by the selectively adjusted positioning of the cooperating guide members 31 and 32.

It is thought that the invention and many of its attendant advantages will be understood from the foregoing description, and it will be apparent that various changes may be made in the form, construction, and arrangement of the parts without departing from the spirit and scope of the invention or sacrificing all of its material advantages, the form hereinbefore described and shown in the drawings being merely a preferred embodiment thereof.

I claim:

1. Adjustable guide mechanism for a dough sheeter having a pair of sheeter rolls adjustable relative to each other peripherally thereof to determine the thickness of a sheet of dough produced thereby, comprising laterally spaced first guide members, means for mounting said guide members to maintain the same in contact with one of said rolls at all times, second guide members slidably engageable with said first guide members, and means for mounting said second guide members to maintain the same in contact with the other of said rolls at all times.

2. In a dough sheeter having a pair of sheeter rolls adjustable relative to each other peripherally to determine the thickness of a sheet of dough produced thereby, adjustable guide mechanism for determining the width of said dough sheet and selectively aligning the same laterally relative to said rolls, comprising a first pair of guide members, means for mounting said guide members to maintain the same in contact at all times with one of said rolls and selectively adjustable laterally of said rolls, a second pair of guide members, and means for mounting said second pair of guide members to maintain the same in contact at all times with the other of said rolls and selectively adjustable laterally of said rolls to maintain each said guide member of said second pair in slidable contact with a guide member of said first pair, whereby dough is prevented from squeezing laterally beyond said guide members axially of said rolls in all adjustable positions of said rolls.

3. In a dough sheeter having a pair of rollers mounted in parallel relationship for rolling dough into a sheet of desired thickness and mounting means for a first one of said rollers adjustable to vary the dough sheet thickness-producing spacing between said rollers, dough sizing guide mechanism for insuring uniformity of size of the dough sheet, comprising guide members spaced from each other longitudinally of and in contact with a second one of said rollers, other guide members respectively contacting said first recited guide members, and means automatically movable with said adjustable mounting means to maintain said other guide members in contact with said first one of said rollers at all times.

4. In a dough sheeter according to claim 3, adjustable mounting means for each of said guide members to facilitate selective positioning thereof laterally with respect to said rollers to predetermine the exact width of said sheet of dough and the lateral position thereof with respect to said rollers.

5. In a dough sheeter having means including a roller for rolling dough into a sheet of desired thickness and mounting means for said roller adjustable to vary the dough sheet thickness, dough sizing guide mechanism for insuring uniformity in size of the dough sheet, comprising a pair of guide members spaced from each other longitudinally of said roller and both engaging with the roller periphery lying between the end faces of the roller, and means automatically movable with said adjustable mounting means to move both of said guide members so as to maintain the same constantly in such peripheral engagement with said roller.

6. In a dough sheeter according to claim 5, means for adjustably mounting said guide members to effect selective positioning thereof longitudinally of said roller to predetermine the width of said dough sheet and the location thereof relative to the ends of said roller.

7. A dough sheeter, comprising a pair of rollers, mounting means for selectively positioning a first one of said rollers in predetermined spaced relationship relative to the other of said rollers, receiving means for receiving a sheet of dough delivered thereto by said rollers, and guide means for determining the amount of dough available to said rollers and assuring uniformity of size of said dough sheet, comprising a first pair of guide members spaced from each other longitudinally of said rollers, means for supporting said guide members and movable with said adjustable mounting means to maintain said first guide members constantly in peripheral engagement with said first roller, a second pair of guide members, and means for mounting said second pair of guide members to maintain the same in constant peripheral contact with said other roller and in sliding contact respectively with said first guide members.

8. A dough sheeter according to claim 7, wherein said means for mounting said guide members are selectively adjustable to effect positioning of said guide members longitudinally of said rollers to predetermine the width of said dough sheet and the specific lateral location thereof on said receiving means.

9. A dough sheeter, comprising a first roller mounted for rotation about a fixed axis, a second roller rotatable with said first roller to form a sheet of dough of predetermined thickness, adjustable means for rotatably mounting said second roller in predetermined peripherally spaced relation to said first roller, a first pair of guide members having dough-guiding surfaces substantially parallel to each other and substantially normal to the axes of said rollers, means for mounting said first pair of guide members in spaced relationship to each other longitudinally of said rollers and maintaining edge portions thereof in peripheral engagement with said first roller, a second pair of guide members each having dough-engaging surfaces, means for mounting said second pair of guide members to dispose said dough-engaging surfaces as substantial continuations respectively of the dough-engaging surfaces of said first pair of guide members, and means for interconnecting said last means and said adjustable means for mounting said second roller so as to maintain edge portions of said second pair of guide members constantly in peripheral engagement with said second roller.

10. In a dough sheeter having a sheeting means including a rotatable roller, selectively adjustable means for mounting said roller to vary the location of the peripheral surface thereof to determine the thickness of a sheet of dough formed by said sheeter, scraper means mounted on said mounting means for constant engagement with the peripheral surface of said roller, guide means for determining the amount of dough available to said roller and maintaining the width of said dough sheet uniform, and means interconnecting said scraper means and said guide means to maintain the latter in constant peripheral engagement with said roller.

11. A dough sheeter according to claim 10, wherein mounting means for said guide means are provided which are adjustable to effect selective positioning of the latter to determine the width and location of said dough sheet relative to said roller.

12. A dough sheeter, comprising a first roller mounted for rotation about a fixed axis, a first pair of guide members having flaring outer portions and inner portions integral therewith and substantially normal to said fixed axis and terminating in lower ends peripherally contacting said roller, means for mounting said guide members for selective adjustment relative to each other axially of said roller, means for delivering dough between said flaring outer portions of said guide members and onto said roller, a second roller rotatable with said first roller to form a sheet of dough of predetermined thickness, adjustable means for rotatably mounting said second roller in predetermined peripherally spaced relation to said first roller, a second pair of guide members having sliding engagement respectively with said inner portions of said first pair of guide members and terminating inwardly in curved edges having the same radius as said second roller, means for mounting said second pair of guide members for selective adjustment axially of said second roller into contact with said first pair of guide members, and means for interconnecting said last means and said adjustable means for mounting said second roller so as to maintain said curved edges of said second pair of guide member constantly in peripheral engagement with said second roller.

References Cited in the file of this patent
UNITED STATES PATENTS

| | | |
|---|---|---|
| 1,542,348 | Ostrom | June 16, 1925 |
| 2,693,154 | Appleton | Nov. 2, 1954 |

FOREIGN PATENTS

| | | |
|---|---|---|
| 603,476 | Great Britain | June 16, 1948 |
| 617,836 | Great Britain | Feb. 11, 1949 |